(12) United States Patent
Iijima et al.

(10) Patent No.: US 8,420,037 B2
(45) Date of Patent: Apr. 16, 2013

(54) AIR POLLUTION CONTROL SYSTEM AND AIR POLLUTION CONTROL METHOD

(75) Inventors: Masaki Iijima, Tokyo (JP); Tsuyoshi Oishi, Tokyo (JP); Takashi Kamijo, Tokyo (JP); Hiroshi Tanaka, Tokyo (JP); Hiromitsu Nagayasu, Tokyo (JP); Naohiko Ukawa, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/305,049

(22) Filed: Nov. 28, 2011

(65) Prior Publication Data

US 2012/0328501 A1 Dec. 27, 2012

(30) Foreign Application Priority Data

Jun. 22, 2011 (JP) .................................. 2011-138724

(51) Int. Cl.
| | |
|---|---|
| B01D 53/50 | (2006.01) |
| B01D 53/62 | (2006.01) |
| B01D 53/78 | (2006.01) |
| B01D 53/79 | (2006.01) |

(52) U.S. Cl.
USPC .................. 423/228; 423/242.1; 423/DIG. 5; 422/105; 422/168; 422/169; 422/170; 422/172

(58) Field of Classification Search .................. 423/228, 423/242.1, DIG. 5; 422/105, 168, 169, 170, 422/172

See application file for complete search history.

(56) References Cited

U.S. PATENT DOCUMENTS

| | | | | |
|---|---|---|---|---|
| 2,486,778 | A | * | 11/1949 | Doumani ...................... 423/228 |
| 4,071,602 | A | * | 1/1978 | Pearce ........................ 423/242.7 |
| 4,477,419 | A | * | 10/1984 | Pearce et al. .................. 423/228 |
| 5,895,634 | A | * | 4/1999 | Mitsuoka et al. ............. 423/220 |
| 2012/0195816 | A1 | * | 8/2012 | Dube et al. .................... 423/220 |

FOREIGN PATENT DOCUMENTS

| | | |
|---|---|---|
| EP | 2 474 349 A1 | 7/2012 |
| JP | 3-193116 A | 8/1991 |
| JP | 7-241440 A | 9/1995 |
| JP | 9-875 A | 1/1997 |
| JP | 10-33938 A | 2/1998 |
| JP | 2009-247932 A | 10/2009 |
| WO | 2011/016412 A1 | 2/2011 |
| WO | 2011-108086 A1 | 9/2011 |

OTHER PUBLICATIONS

Extended European Search Report dated Sep. 26, 2012, issued in corresponding European patent application No. 11194734.7.
Australian Office Action dated Nov. 2, 2012, issued in corresponding Australian Patent Application No. 2012200041 (5 pages).

* cited by examiner

*Primary Examiner* — Timothy Vanoy
(74) *Attorney, Agent, or Firm* — Westerman, Hattori, Daniels & Adrian, LLP

(57) ABSTRACT

An air pollution control system includes a desulfurization apparatus 13 that reduces sulfur oxide contained in flue gas 12 supplied from a boiler 11; and a $CO_2$ recovery apparatus 15 including a $CO_2$ absorber 21 that reduces $CO_2$ contained in flue gas 12 that has been desulfurized by the desulfurization apparatus, with the aid of an amine absorbent and an absorbent regenerator 22 that regenerates the amine absorbent. Part 14a of desulfurized flue gas 14 containing SOx is supplied to treated flue gas 16, from which $CO_2$ has been reduced and which is discharged from a top portion of the $CO_2$ absorber 21, so that remaining mist amine accompanying the treated flue gas 16 is neutralized to amine sulfate or amine sulfite.

15 Claims, 9 Drawing Sheets

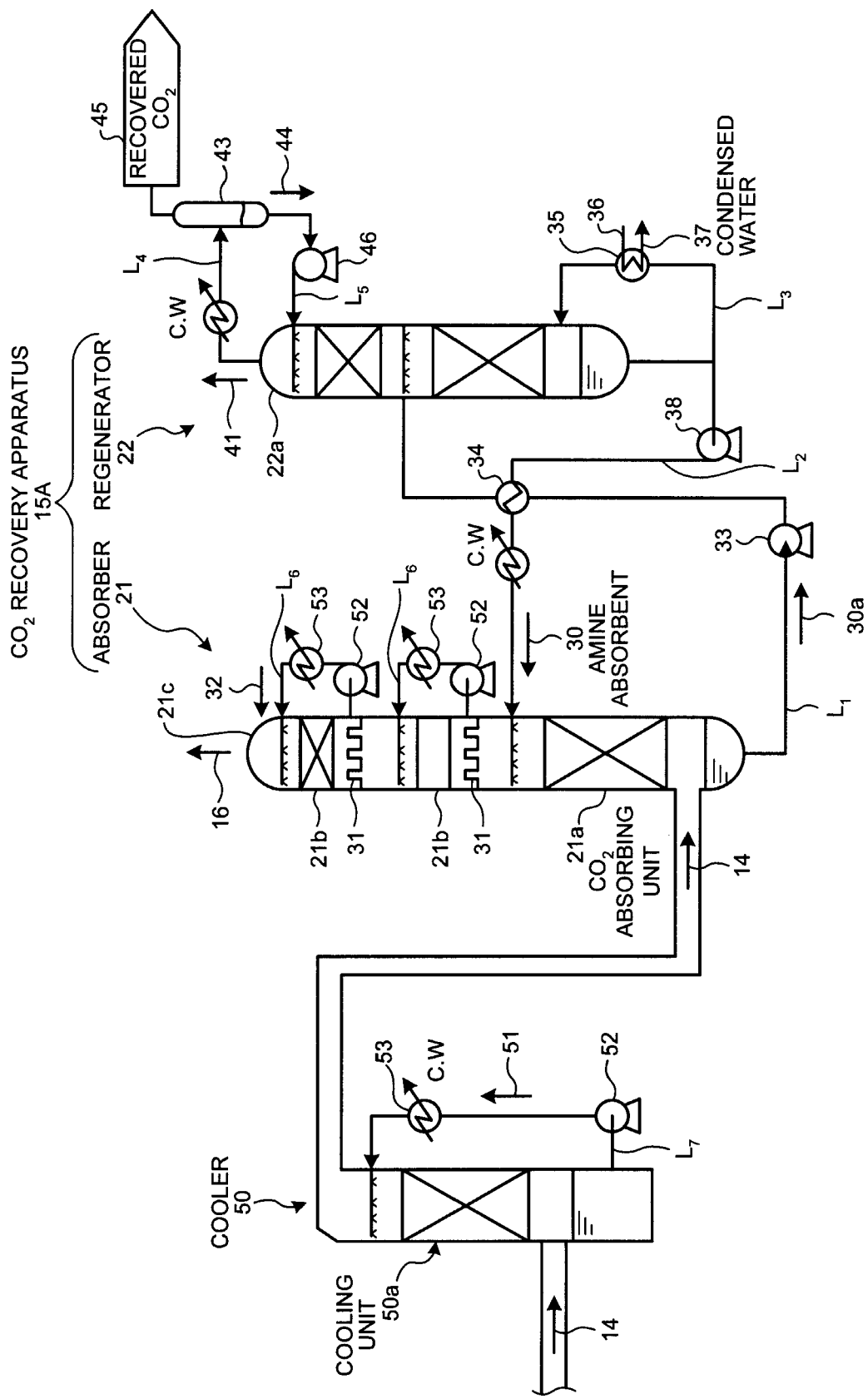

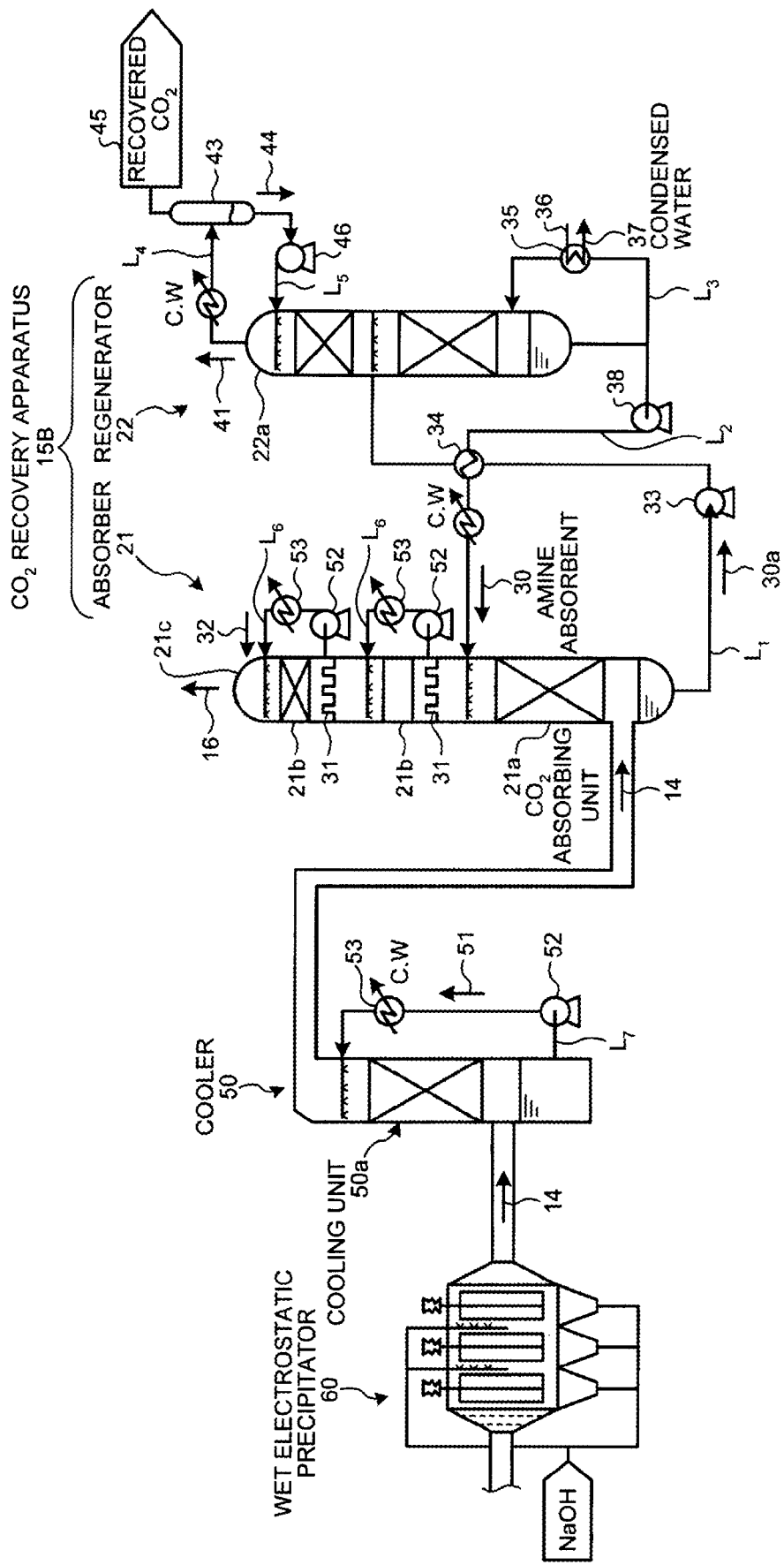

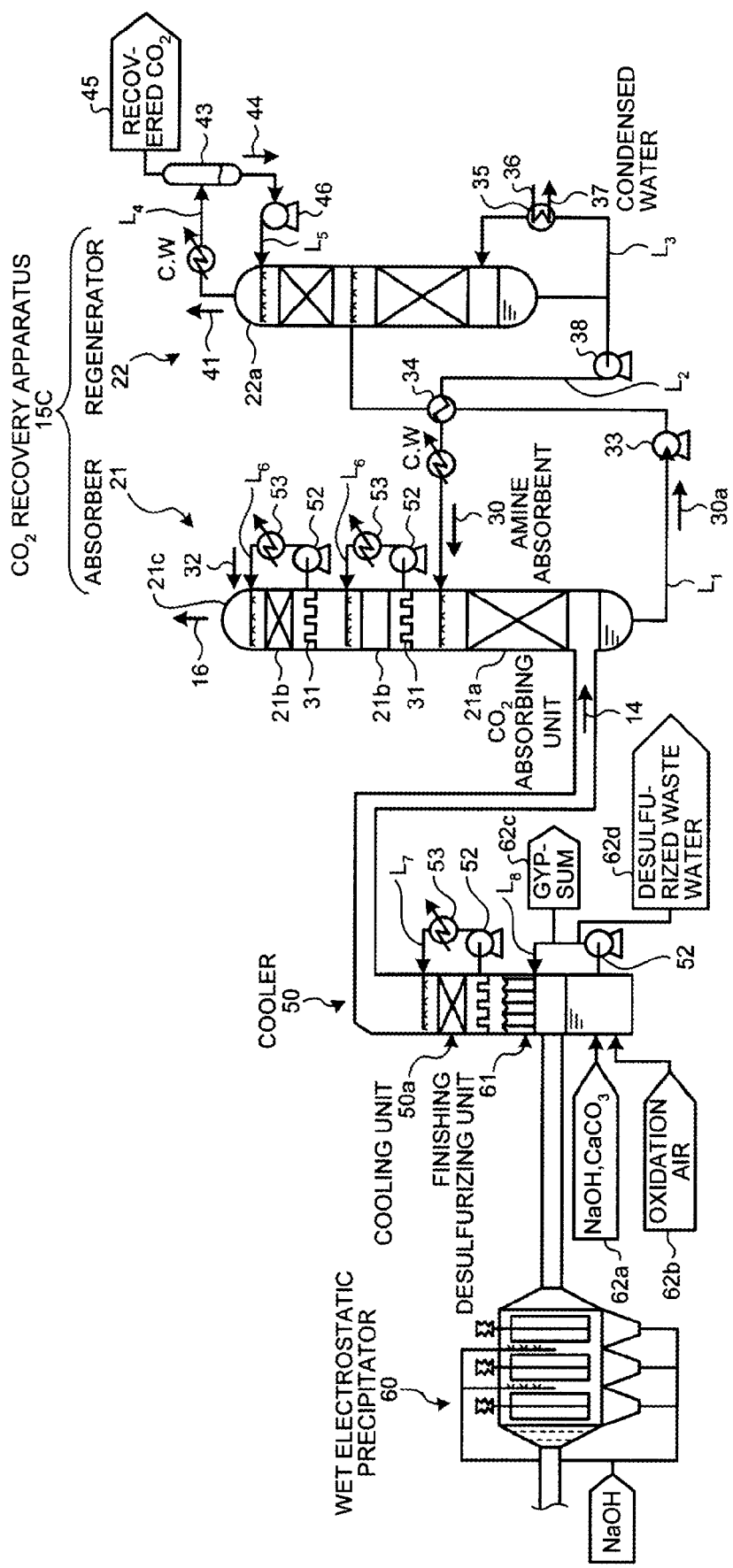

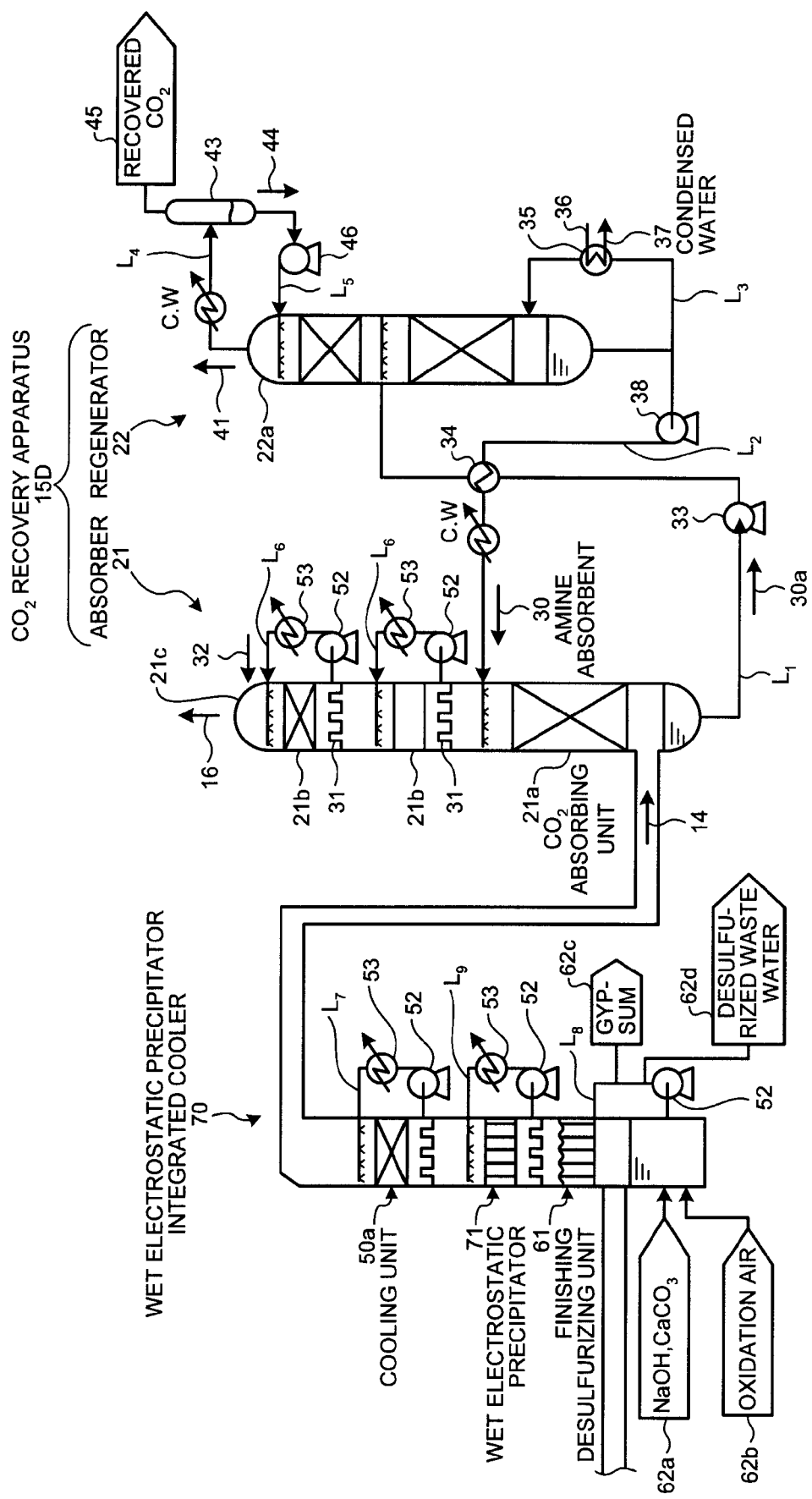

AIR POLLUTION CONTROL SYSTEM AND AIR POLLUTION CONTROL METHOD

FIELD

The present invention relates to an air pollution control system and an air pollution control method for preventing an amine absorbent from being discharged to the outside of a $CO_2$ recovery apparatus when $CO_2$ contained in flue gas is absorbed and reduced by the amine absorbent.

BACKGROUND

In recent years, the greenhouse effect due to $CO_2$ has been pointed out as one of the causes of the global warming, and it has become an international urgent task to provide countermeasures to $CO_2$ to protect the global environment against the warming. $CO_2$ is generated by any human activities involving the combustion of fossil fuels, and there are increasing demands for suppressing $CO_2$ emissions. Along with the increasing demands, studies are energetically being made on a $CO_2$ reduction and recovery method, in which $CO_2$ contained in flue gas emitted from industrial equipment, such as boilers or gas turbines, is reduced and recovered by bringing the flue gas in contact with an amine-based $CO_2$ absorbent, and on an air pollution control system that stores the recovered $CO_2$ without releasing it into the air, in order for the method and the system to work in power plants, such as thermal plants, that consume a large amount of fossil fuels.

A $CO_2$ recovery apparatus has been proposed that performs, as processes for reducing and recovering $CO_2$ from flue gas with the aid of the $CO_2$ absorbent as above, a process performed in a $CO_2$ absorber (hereinafter, also described as an "absorber") in which the flue gas is brought into contact with the $CO_2$ absorbent, and a process performed in an absorbent regenerator (hereinafter, also described as a "regenerator") in which the $CO_2$ absorbent that has absorbed $CO_2$ is heated to isolate $CO_2$ and the $CO_2$ absorbent is regenerated and circulated back to the $CO_2$ absorber for reuse (see, for example, Patent Document 1).

In the $CO_2$ absorber, the flue gas is brought into countercurrent contact with the amine-based $CO_2$ absorbent, such as alkanolamine, (hereinafter, described as an "amine absorbent"), so that $CO_2$ contained in the flue gas is absorbed by the $CO_2$ absorbent due to a chemical reaction (an exothermic reaction) and the flue gas with $CO_2$ reduced is released to the outside of a system. The $CO_2$ absorbent that has absorbed $CO_2$ is also referred to as rich solution. The pressure of the rich solution is increased by a pump. Thereafter, the rich solution is heated in a heat exchanger by a hot $CO_2$ absorbent (lean solution), which has been regenerated by releasing $CO_2$ in the regenerator, and then the rich solution is supplied to the regenerator.

CITATION LIST

Patent Literature

Patent Literature 1: Japanese Patent Application Laid-open No. H3-193116

SUMMARY

Technical Problem

In an air pollution control system, gas of the amine absorbent can be reduced to the extent that the gas can hardly be decomposed in treated flue gas that has reduced $CO_2$ and that is released from the $CO_2$ absorber absorbing $CO_2$ in the $CO_2$ recovery apparatus, and mist of the amine absorbent can also be largely reduced. However, part of the amine absorbent may be released to the outside of the system by accompanying the treated flue gas.

The amine absorbent released to the outside of the system remains in the air, so it is concerned that the amine absorbent may react with $NO_x$ in the air due to a photochemical reaction resulting in nitrosamine.

Therefore, there is an increasing need to establish an air pollution control system that can suppress release of remaining amine from the $CO_2$ absorber.

In view of the above problems, the present invention is made to provide a system and a method for controlling air pollution for preventing an amine absorbent from accompanying the treated flue gas that has reduced $CO_2$, when the treated flue gas is discharged to the outside of a system.

Solution to Problem

An aspect of the present invention, an air pollution control system includes: a desulfurization apparatus that reduces sulfur oxide contained in flue gas supplied from a boiler; and a $CO_2$ recovery apparatus that includes a $CO_2$ absorber that reduces $CO_2$ contained in flue gas that has been desulfurized by the desulfurization apparatus, by an amine absorbent, and an absorbent regenerator that regenerates the amine absorbent. Gas containing SOx is supplied to treated flue gas, from which $CO_2$ is reduced and which is discharged from a top portion of the $CO_2$ absorber, so that remaining mist amine accompanying the treated flue gas is neutralized to amine sulfate or amine sulfite.

Advantageously, in the air pollution control system, the gas containing SOx is part of flue gas obtained on one of an upstream side or a downstream side of the desulfurization apparatus.

Advantageously, in the air pollution control system, the treated flue gas does not contain gas amine.

Advantageously, the air pollution control system further includes a measuring unit that measures the remaining mist amine.

Advantageously, the air pollution control system further includes a measuring unit that measures the remaining mist amine. A sufficient amount of SOx is supplied to the remaining mist amine to neutralize the remaining mist amine, on the basis of a concentration of the remaining mist amine measured by the measuring unit.

Advantageously, in the air pollution control system, the $CO_2$ absorber includes a $CO_2$ absorbing unit that reduces $CO_2$ by bringing the amine absorbent and the flue gas in countercurrent contact with each other; and at least one washing unit that is arranged on a downstream side of gas flow in the $CO_2$ absorbing unit and that reduces remaining amine contained in the flue gas.

Advantageously, the air pollution control system further includes a cooler that is arranged on an upstream side of the $CO_2$ absorber and that cools the flue gas.

Advantageously, the air pollution control system further includes a wet electrostatic precipitator on an upstream side of the cooler.

Advantageously, the air pollution control system further includes a finishing desulfurizing unit at a lower portion of the cooler.

Advantageously, the air pollution control system further includes a finishing desulfurizing unit and a wet electrostatic precipitator at a lower portion of the cooler.

Advantageously, the air pollution control system further includes: a denitrization apparatus that reduces nitrogen oxide contained in the flue gas; and a dry electrostatic precipitator that reduces soot contained in the flue gas.

According to another aspect of the present invention, an air pollution control method includes: reducing, by a desulfurization apparatus, sulfur oxide contained in flue gas that contains $CO_2$ and that is supplied from a boiler; reducing, in a $CO_2$ absorber, $CO_2$ contained in flue gas that is desulfurized at the reducing by the desulfurization apparatus, by an amine absorbent; and supplying gas containing SOx to treated flue gas, from which $CO_2$ is reduced and which is discharged from a top portion of the $CO_2$ absorber, thereby neutralizing remaining mist amine accompanying the treated flue gas to amine sulfate or amine sulfite.

Advantageously, in the air pollution control method, the gas containing SOx is part of flue gas obtained on one of an upstream side or a downstream side of the desulfurization apparatus.

Advantageously, in the air pollution control method, the treated flue gas does not contain gas amine.

Advantageously, the air pollution control method, further includes: measuring, by a measuring unit, the remaining mist amine; and supplying a sufficient amount of SOx to the remaining mist amine to neutralize the remaining mist amine, on the basis of concentration of the remaining mist amine measured at the measuring.

Advantageous Effects of Invention

According to one aspect of the present invention, gas containing $SO_x$ is supplied to remaining amine accompanying treated flue gas discharged from a $CO_2$ absorber, which absorbs and reduces $CO_2$ from the flue gas with the aid of an amine absorbent, so that the remaining amine can be neutralized. Consequently, release of the amine absorbent to the outside of a system can be suppressed. Therefore, it is possible not to release the amine absorbent to the air, enabling to prevent generation of nitrosamine based on the amine absorbent.

BRIEF DESCRIPTION OF DRAWINGS

FIG. 6 is a diagram illustrating an example of a $CO_2$ recovery apparatus in an air pollution control system according to a fourth embodiment.

FIG. 7 is a diagram illustrating an example of a $CO_2$ recovery apparatus in an air pollution control system according to a fifth embodiment.

FIG. 8 is a diagram illustrating an example of a $CO_2$ recovery apparatus in an air pollution control system according to a sixth embodiment.

FIG. 9 is a diagram illustrating an example of a $CO_2$ recovery apparatus in an air pollution control system according to a seventh embodiment.

DESCRIPTION OF EMBODIMENTS

Exemplary embodiments of the present invention will be explained in detail below with reference to the accompanying drawings. The present invention is not limited by the embodiments but includes configurations made by any combinations of the embodiments. In addition, constituent elements in the embodiments include those that can be easily thought of by persons skilled in the art or that are substantially equivalent.

First Embodiment

Figure 1:
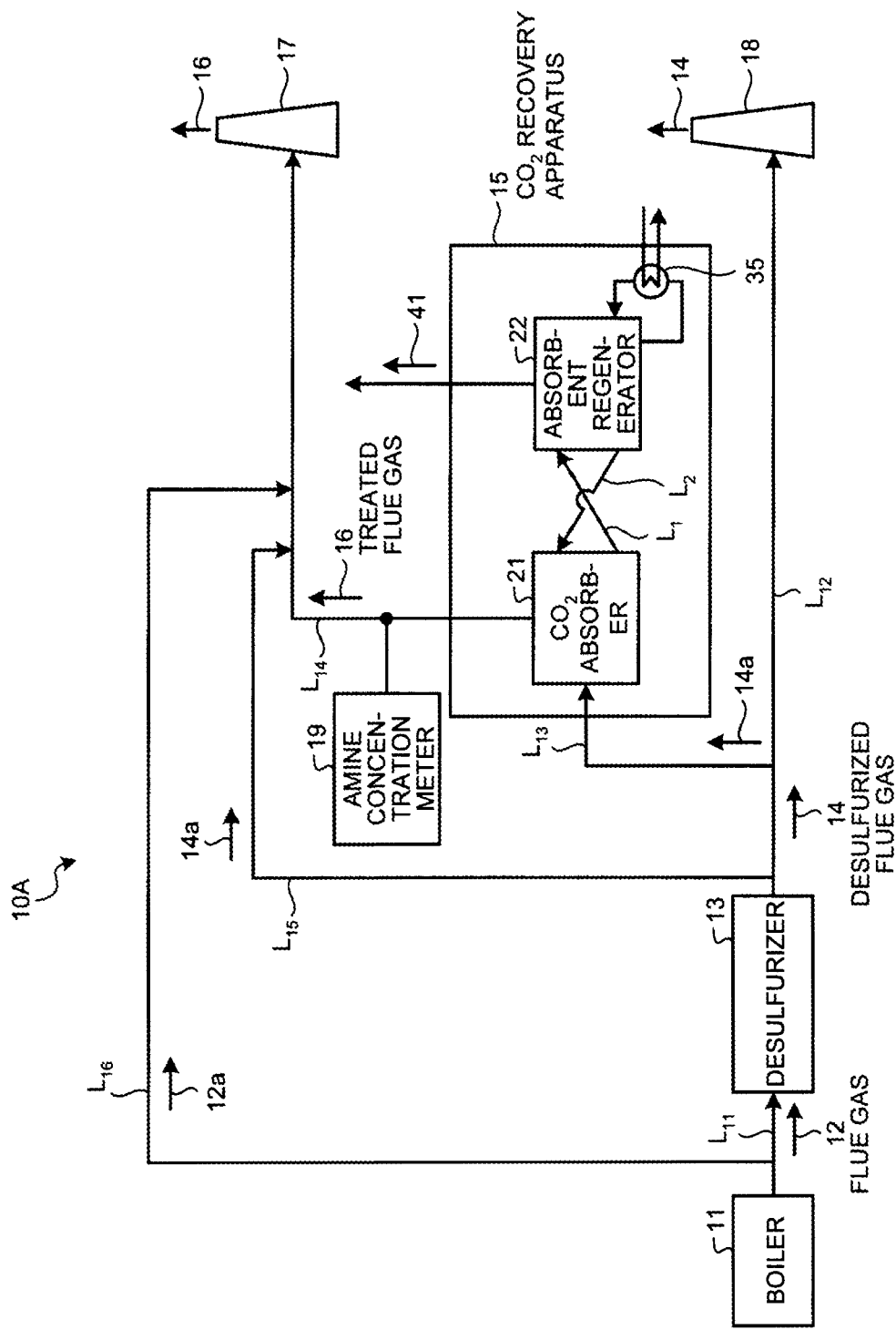
FIG. 1 is a schematic diagram of an air pollution control system according to a first embodiment.

An air pollution control system according to a first embodiment of the present invention will be explained with reference to the drawings. FIG. 1 is a schematic diagram of the air pollution control system according to the first embodiment. As illustrated in FIG. 1, an air pollution control system 10A according to the first embodiment includes: a desulfurizer 13 that reduces sulfur oxide contained in flue gas 12 supplied from a boiler 11 that uses coal for example as fuel; and a $CO_2$ recovery apparatus 15 including a $CO_2$ absorber 21 that reduces $CO_2$ from the desulfurized flue gas 12 with the aid of an amine absorbent, and an absorbent regenerator 22 that regenerates the amine absorbent. The air pollution control system 10A supplies part 14a of desulfurized flue gas 14 containing SOx to treated flue gas 16 that has reduced $CO_2$ and that is discharged from a top of the $CO_2$ absorber 21, in order that remaining mist amine accompanying the treated flue gas 16 can be neutralized to amine sulfate or amine sulfite.

In FIG. 1, a reference code $L_1$ denotes a rich solution supply line, $L_2$ denotes a lean solution supply line, $L_{11}$ denotes a flue gas supply line for supplying the flue gas 12 from the boiler 11, $L_{12}$ denotes a desulfurized flue gas supply line for supplying the desulfurized flue gas 14 to a desulfurized flue gas stack 18, $L_{13}$ denotes a $CO_2$ recovery bifurcation gas line, $L_{14}$ denotes a discharge line for discharging the treated flue gas 16 from the $CO_2$ absorber 21 to a treated flue gas stack 17, and $L_{15}$ denotes a neutralizing desulfurized flue gas supply line.

In general, when an amine absorbent is used as absorbing solution, a closed system line is constructed in the $CO_2$ recovery apparatus 15 such that the amine absorbent absorbs $CO_2$ contained in the desulfurized flue gas 14 in the $CO_2$ absorber 21 in order to reduce $CO_2$ from the desulfurized flue gas 14 and the amine absorbent that has absorbed $CO_2$ is reduced in the absorbent regenerator 22 and reused in the $CO_2$ absorber 21.

In the $CO_2$ absorber 21, the amine absorbent is brought into, for example, counter-current contact with the desulfurized flue gas 14 so that $CO_2$ is taken into the amine absorbent.

Meanwhile, there may be a case that the amine absorbent is not maintained as liquid but is changed into gas and mist as a result of contact between the amine absorbent and the desulfurized flue gas 14 in the $CO_2$ absorber 21, and the gas and the mist may be discharged from the outside of the system from the top of the $CO_2$ absorber 21 together with the treated flue gas 16.

When the amine absorbent remains as liquid, it circulates inside the closed system line and is not discharged to the outside of the system of the $CO_2$ absorber 21. However, if the gas and the mist of the amine absorbent are discharged to the outside of the system of the $CO_2$ absorber 21, they may be oxidized with $NO_2$ in the air because of a photochemical reaction with ultraviolet light, resulting in nitrosamine.

Therefore, to suppress release of the gas and the mist of the amine absorbent to the outside of the system, a washing unit that performs washing treatment is provided on the inner top of the $CO_2$ absorber 21 and washing treatment is performed on the treated flue gas 16, so that the gas of the amine absorbent can be reduced from the treated flue gas 16 to the extent that the gas is not detected. However, approximately 1 to 10 ppm of the mist of the amine absorbent may remain and be discharged to the outside of the system together with the treated flue gas 16.

The concentration of the mist of the amine absorbent discharged to the outside of the system as above is extremely low. However, according to the present invention, SOx gas is supplied to the mist of the amine absorbent so that the mist can be neutralized before it reaches the treated flue gas stack 17.

The air pollution control system 10A illustrated in FIG. 1 is a system that partly recovers $CO_2$ contained in the part 14a of the desulfurized flue gas 14 that is obtained by reducing SOx from the flue gas 12 supplied from the boiler 11 by the desulfurizer 13.

Some boiler plants partly recover $CO_2$ without recovering the whole amount of $CO_2$ from the gas supplied from the boiler 11, and the present invention is applied to such systems that partly recover $CO_2$.

In the first embodiment, air pollution control for partly recovering $CO_2$ as above is performed such that the part 14a of the desulfurized flue gas 14 fed from the desulfurizer 13 is supplied to the treated flue gas 16, which is discharged from the outside of the system via the top of the $CO_2$ absorber 21, through the neutralizing desulfurized gas supply line $L_{15}$, so that the mist of the amine absorbent accompanying the treated flue gas 16 is neutralized to amine sulfate (mineral salt) or amine sulfite in order not to release the mist of the amine absorbent as it is to the outside of the system.

Figure 4:
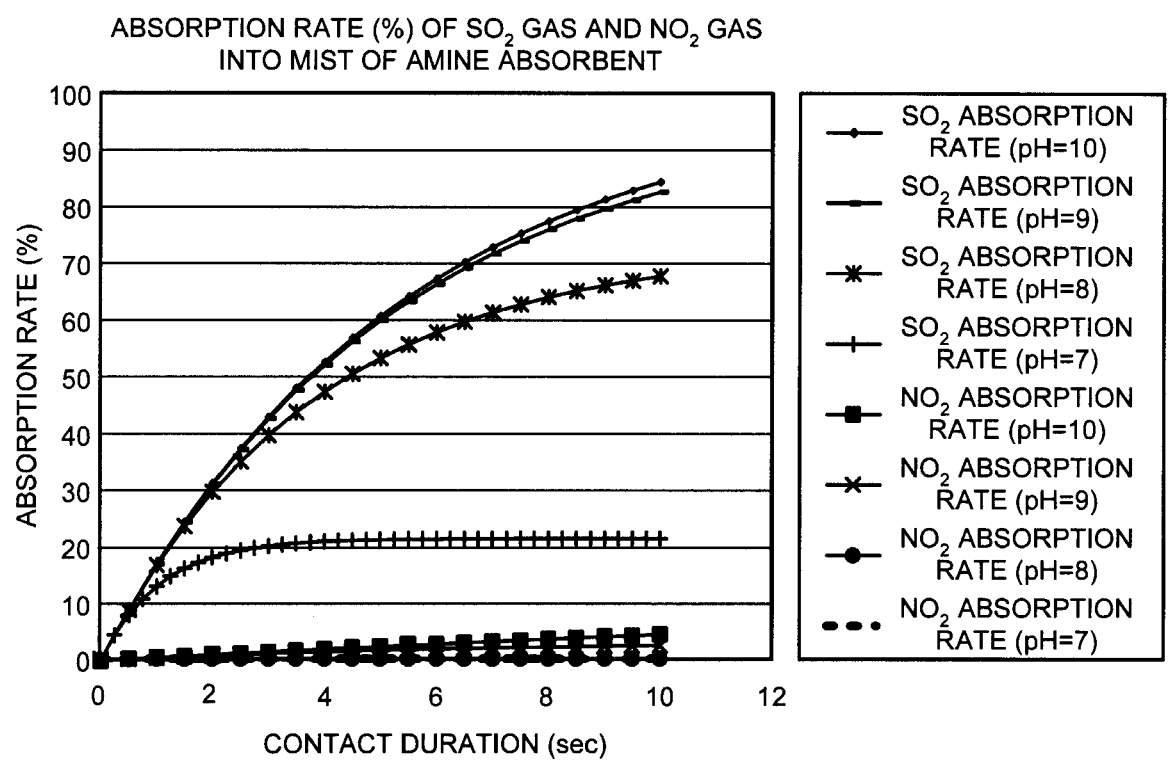
FIG. 4 is a diagram illustrating absorption rates of $SO_2$ gas and $NO_2$ gas into mist of an amine absorbent at each pH.

FIG. 4 is a diagram illustrating absorption rates of $SO_2$ gas and $NO_2$ gas into the mist of the amine absorbent at each pH. In FIG. 4, a horizontal axis represents contact duration (seconds) and a vertical axis represents the absorption rate (%).

According to the result illustrated in FIG. 4, with the mist of the amine absorbent at pH 7, the absorption rate of $SO_2$ into the mist of the amine absorbent is slightly higher than 20%.

By contrast, at pH 8 or greater, the absorption rate of $SO_2$ into the mist of the amine absorbent largely increases such that the absorption rate exceeds 60% within 5 seconds at pH 9 or greater and within about 8 seconds at pH 8.

Compared with the absorption rate of the $SO_2$ gas, the absorption rate of the $NO_2$ gas remains at a few % or lower even when pH changes as illustrated in FIG. 4, so that the $NO_2$ can hardly be absorbed by the mist of the absorbing solution.

Figure 5:
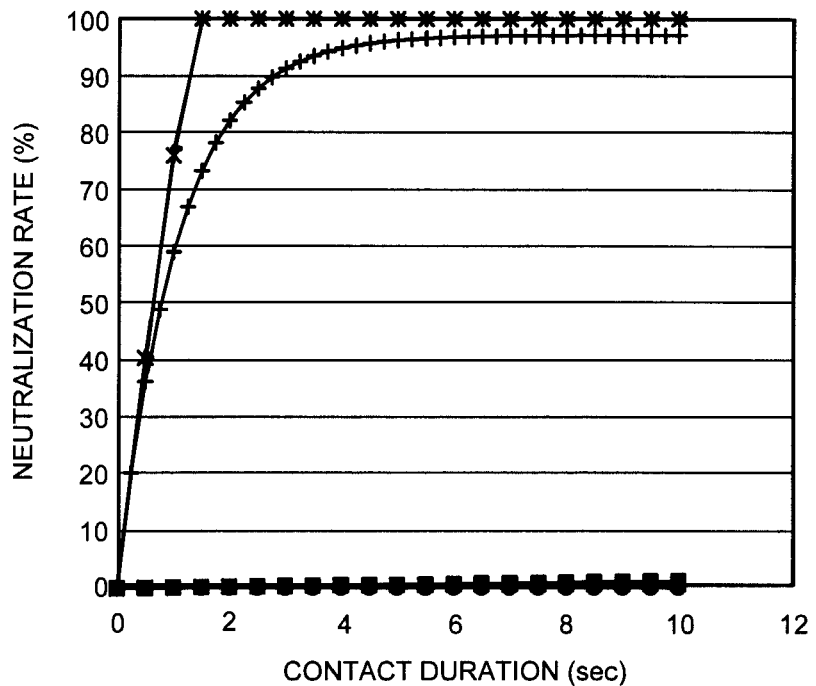
FIG. 5 is a diagram illustrating neutralization rates (%) of amine with $SO_2$ and $NO_2$ absorbed by mist of the amine absorbent.

FIG. 5 is a diagram illustrating the neutralization rate (%) of amine with $SO_2$ and $NO_2$ absorbed by the mist of amine absorbent. In FIG. 5, a horizontal axis represents a contact duration (seconds) and a vertical axis represents the neutralization rate (%). A reaction speed of the neutralization of the remaining amine with $SO_2$ absorbed by the mist of the amine absorbent is such that, as illustrated in FIG. 5, the neutralization reaction is complete 100% in 2 seconds at pH 8 or greater.

A duration for discharging the treated flue gas 16 from the top of the $CO_2$ absorber 21 to the outside via the treated flue gas stack 17 is approximately 3 to 10 seconds in accordance with the flow rate of the treated flue gas. Therefore, sufficient durations are assured for the absorption and the neutralization to supply SOx ($SO_2$) to the mist amine accompanying the treated flue gas 16 and complete the neutralization.

An amine concentration meter 19 provided in the middle of the discharge line $L_{14}$ of the treated flue gas 16 monitors the mist of the amine absorbent remaining in the treated flue gas 16 at predetermined time intervals according to need, so that the concentration of vapor and mist amine to be discharged to the outside is measured.

Therefore, a sufficient amount of SOx to reduce the mist of the amine absorbent is supplied on the basis of the concentration measured by the amine concentration meter 19.

When the boiler 11 is in the stable state without a variation in operating conditions, it is possible to estimate the mist of the amine absorbent to be discharged, on the basis of past accumulated data, and supply a slightly excessive amount of SOx to perform the neutralization.

When the desulfurization performance of the desulfurizer 13 is improved and the concentration of SOx in the desulfurized flue gas 14 remains lower than a desired value, it may be possible to supply a part 12a (SOx concentration: 300 to 2,000 ppm) of the flue gas 12 before the flue gas 12 is introduced into the desulfurizer 13. Namely, it is possible to supply the part 12a of the flue gas 12, which is not yet desulfurized and contains a large amount of SOx, via the line $L_{16}$ that bypasses the desulfurizer 13 in order to perform the neutralization.

To neutralize the remaining amine, it is sufficient to supply 1 mol of SOx to 2 mol of amine.

Therefore, to neutralize 10 ppm of the mist of amine for example, it is sufficient to supply at least 5 ppm or higher of SOx.

According to the first embodiment, in the air pollution control system that partly recovers $CO_2$, the part 14a of the desulfurized flue gas 14 is supplied to the treated flue gas 16 that is discharged from the $CO_2$ absorber 21, so that the mist of the amine absorbent accompanying the treated flue gas 16 can be neutralized on the way to the treated flue gas stack 17 or inside the treated flue gas stack 17. Therefore, even when the treated flue gas 16 discharged from the treated flue gas stack 17 is dispersed into the air, because the mist of the amine absorbent is neutralized, it is possible to prevent generation of nitrosamine due to oxidation in the air.

According to the first embodiment, a case is explained that the concentration of the mist amine in the treated flue gas 16 discharged from the $CO_2$ absorber 21 is low. However, the present invention is not limited to the above. Even when the concentration of the mist amine in the treated flue gas 16 discharged from the $CO_2$ absorber 21 is high, it is possible to neutralize the mist amine by supplying a sufficient amount of SOx to reduce the mist of the amine absorbent or by supplying the part 12a of the flue gas 12 from the boiler 11. It is also possible to separately reduce amine sulfate that is generated by the neutralization, before the flue gas is discharged from the stack.

Second Embodiment

Figure 2:
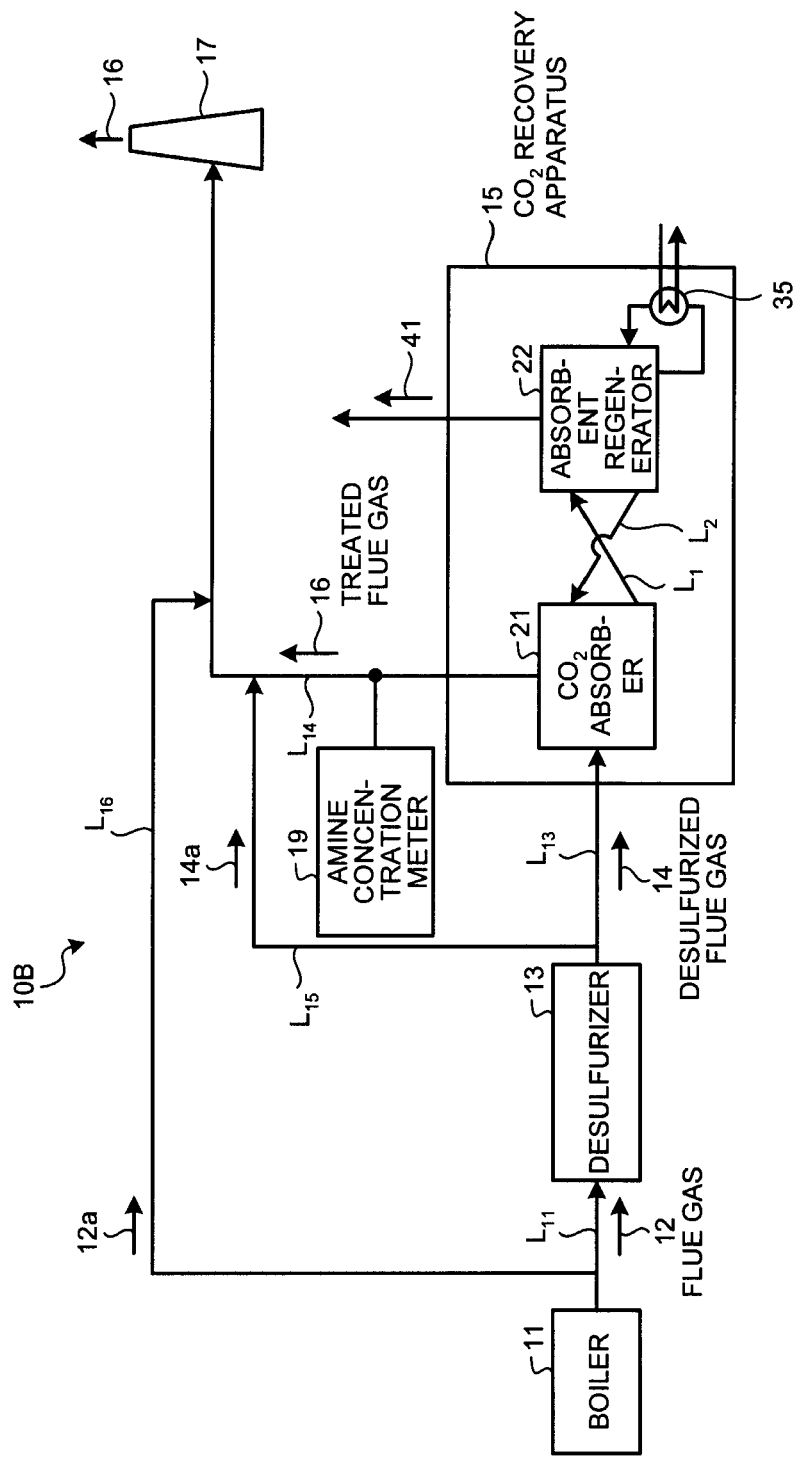
FIG. 2 is a schematic diagram of an air pollution control system according to a second embodiment.

An air pollution control system according to a second embodiment of the present invention will be explained with reference to the drawings. FIG. 2 is a schematic diagram of the air pollution control system according to the second embodiment. The same components as those in the configuration of the air pollution control system illustrated in FIG. 1 are denoted by the same reference codes and explanation thereof will not be repeated.

As illustrated in FIG. 2, an air pollution control system 10B according to the second embodiment causes the $CO_2$ recovery apparatus 15 to treat the whole amount of the desulfurized flue gas 14 that has been desulfurized by the desulfurizer 13, thereby absorbing and reducing the whole amount of $CO_2$.

According to the second embodiment, the part 14a of the desulfurized flue gas 14 or the part 12a of the flue gas 12 containing a large amount of SOx from the boiler 11 is supplied to the treated flue gas 16 in accordance with the concentration of the mist amine in the treated flue gas 16 discharged from the $CO_2$ absorber 21.

According to the second embodiment, in the air pollution control system that recovers the whole amount of $CO_2$, the part 14a of the desulfurized flue gas 14 or the part 12a of the flue gas 12 containing a large amount of SOx from the boiler 11 is supplied to the treated flue gas 16 discharged from the $CO_2$ absorber 21, so that the mist of the amine absorbent accompanying the treated flue gas 16 can be neutralized on the way to the treated flue gas stack 17 or inside the treated flue gas stack 17.

Therefore, even when the treated flue gas 16 discharged from the treated flue gas stack 17 is dispersed into the air, because the mist of the amine absorbent is neutralized, it is possible to prevent generation of nitrosamine due to oxidation in the air.

Third Embodiment

Figure 3:
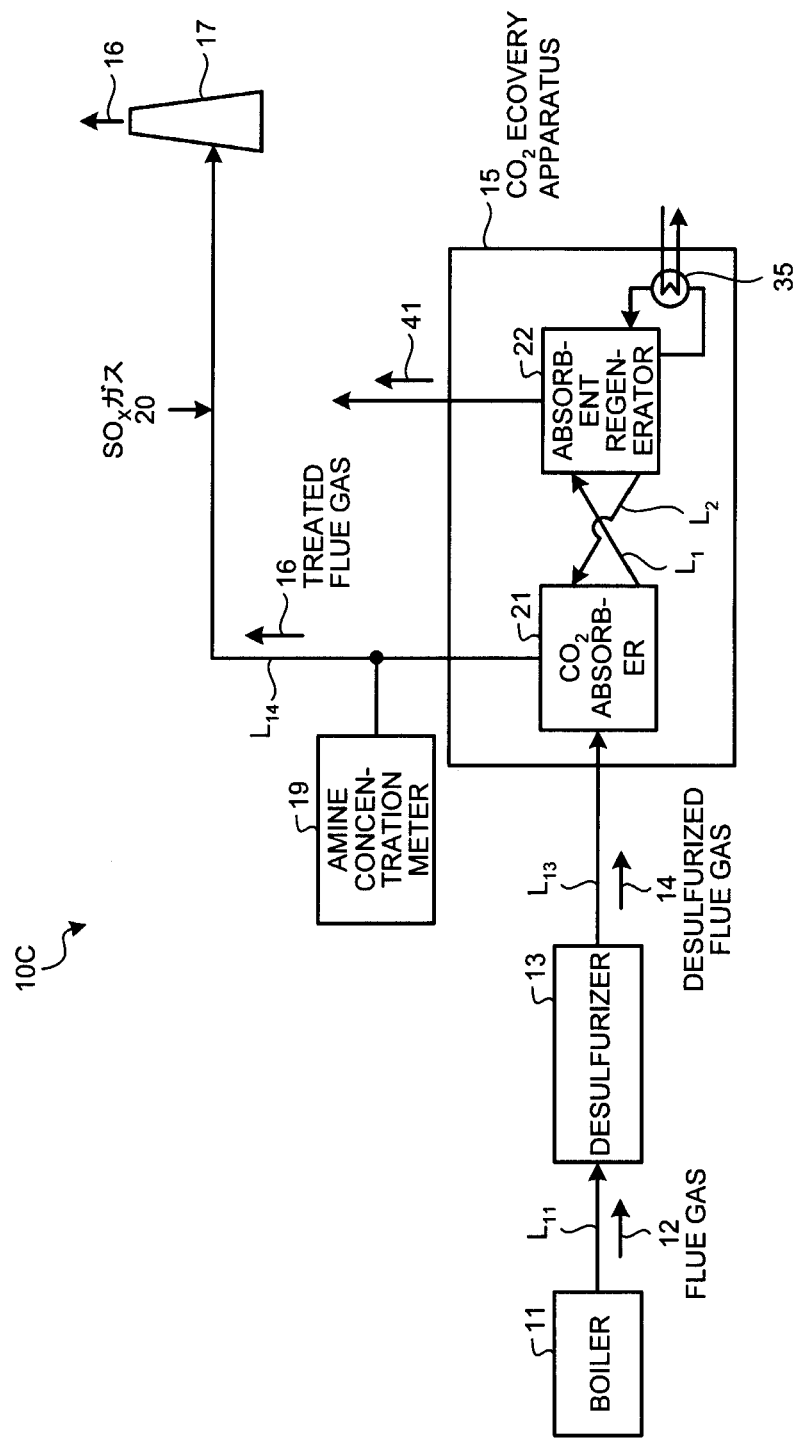
FIG. 3 is a schematic diagram of an air pollution control system according to a third embodiment.

An air pollution control system according to a third embodiment of the present invention will be explained with reference to the drawings. FIG. 3 is a schematic diagram of the air pollution control system according to the third embodiment. The same components as those in the configuration of the air pollution control system illustrated in FIG. 1 are denoted by the same reference codes and explanation thereof will not be repeated.

As illustrated in FIG. 3, when the amount of SOx in the flue gas 12 is small because of the type of fuel burned in the boiler 11, an air pollution control system 10C according to the third embodiment may not be able to neutralize the mist of the amine absorbent accompanying the treated flue gas 16. In this case, an SOx supply means (not illustrated) directly supplies SOx gas 20 to the treated flue gas 16 in order to neutralize the mist amine accompanying the treated flue gas 16.

According to the third embodiment, in the air pollution control system that recovers the whole amount of $CO_2$, when the amount of SOx in the flue gas 12 is small, the SOx gas 20 is directly supplied to the treated flue gas 16, so that the mist of the amine absorbent accompanying the treated flue gas 16 can be neutralized on the way to the treated flue gas stack 17 or inside the treated flue gas stack 17.

Therefore, even when the treated flue gas 16 discharged from the treated flue gas stack 17 is dispersed into the air, because the mist of the amine absorbent is neutralized, it is possible to prevent generation of nitrosamine due to oxidation in the air.

Fourth Embodiment

A $CO_2$ recovery apparatus in an air pollution control system according to a fourth embodiment will be explained with reference to the drawings. FIG. 6 is a diagram illustrating an example of the $CO_2$ recovery apparatus in the air pollution control system according to the fourth embodiment.

A concrete example of the $CO_2$ recovery apparatus 15 will be explained, in which the concentration of the mist amine in the treated flue gas 16 discharged from the $CO_2$ absorber 21 is low as explained in the first to the third embodiments as above. The present invention is not limited by the following embodiments.

As illustrated in FIG. 6, a $CO_2$ recovery apparatus 15A according to the third embodiment includes: a cooler 50 including a cooling unit 50a that cools the desulfurized flue gas 14 containing $CO_2$; the $CO_2$ absorber (hereinafter, appropriately described as an "absorber") 21 that receives the cooled desulfurized flue gas 14 and brings the received desulfurized flue gas 14 in contact with an amine absorbent that is $CO_2$ absorbing solution (lean solution) 30 to reduce $CO_2$; and the absorbent regenerator (hereinafter, appropriately described as a "regenerator") 22 that regenerates the amine absorbent that has absorbed $CO_2$ (rich solution 30a). In the $CO_2$ recovery apparatus, the lean solution 30 from which $CO_2$ has been reduced in the absorbent regenerator 22 is reused in the $CO_2$ absorber 21. The $CO_2$ absorber 21 includes a $CO_2$ absorbing unit 21a that absorbs $CO_2$ contained in the desulfurized flue gas 14 with the aid of the amine absorbent (lean solution) 30; and washing units 21b that are arranged on the upper side (on the downstream side of the gas flow) in the $CO_2$ absorbing unit 21a, cool the $CO_2$ reduced flue gas, and recover the accompanying $CO_2$ absorbing solution.

In the absorber 21, the desulfurized flue gas 14 containing $CO_2$ is brought into counter-current contact with the amine absorbent 30 that is based on, for example, alkanolamine, in the $CO_2$ absorbing unit 21a that is arranged on the lower side of the $CO_2$ absorber 21, so that $CO_2$ contained in the desulfurized flue gas 14 is absorbed by the amine absorbent 30 through a chemical reaction ($R\text{---}NH_2+H_2+CO_2 \rightarrow R\text{---}NH_3HCO_3$).

The treated flue gas 16 obtained after $CO_2$ is reduced flows upward to the washing units 21b side through chimney trays 31 and comes into gas-liquid contact with washing water 32 supplied from a top portion 21c of the washing unit 21b, so that liquid of the amine absorbent 30 and gas of the amine absorbent 30 accompanying the treated flue gas 16 are recovered. A reference code 52 denotes a circulation pump, a reference code 53 denotes a cooling device, and reference codes $L_6$ denotes washing liquid circulation lines.

Thereafter, the treated flue gas 16 from which the liquid and the gas of the amine absorbent 30 have been reduced is discharged to the outside (to the treated flue gas stack 17 side, see FIG. 1) from the top portion 21c of the $CO_2$ absorber 21.

Although not illustrated in the drawings, it is possible to provide a mist eliminator that captures mist contained in the treated flue gas 16, on the top portion 21c of the $CO_2$ absorber 21 in order to further reduce the mist of the amine absorbent.

The pressure of the rich solution 30a that has absorbed $CO_2$ is increased by a rich solvent pump 33 provided in the middle of the rich solution supply line $L_1$. Thereafter, the rich solution 30a is heated with the lean solution 30, which is regenerated in the absorbent regenerator 22, in a lean solution heat exchanger 34 and is supplied to a top portion 22a of the absorbent regenerator 22.

The rich solution 30a that is released to the inside of the regenerator via the top portion 22a of the absorbent regenerator 22 is heated by water vapor supplied from the bottom portion of the absorbent regenerator 22, so that most of $CO_2$ is released. The $CO_2$ absorbing solution from which part or most of $CO_2$ has been released in the absorbent regenerator 22 is described as "semi-lean solution". The semi-lean solution (not illustrated) becomes lean solution (the amine absorbent 30) with almost all $CO_2$ reduced before the semi-lean solution reaches the bottom portion of the absorbent regenerator 22. Part of the lean solution 30 is heated by saturated water vapor 36 in a regenerative heater 35 provided in a circulation line $L_3$. The saturated water vapor becomes condensed water 37 after the heating.

Meanwhile, $CO_2$ gas 41 accompanied by water vapor is released from the rich solution and the semi-lean solution (not illustrated) through the top portion 22a of the absorbent regenerator 22.

The $CO_2$ gas 41 accompanied by the water vapor is introduced through a gas discharge line $L_4$; the water vapor is condensed by a condenser 42 provided in the middle of the gas discharge line $L_4$; condensed water 44 is separated in a separation drum 43; and $CO_2$ gas is discharged to the outside of the system, resulting in recovered $CO_2$ 45 to be subjected to post treatment, such as compression and recovery treatment.

The condensed water 44 separated in the separation drum 43 is supplied to the upper portion of the absorbent regenerator 22 by a condensed water circulation pump 46 provided in the middle of a condensed water line $L_5$.

Although not illustrated in the drawings, part of the condensed water 44 is supplied to the washing units 21b side as the washing water 32 for the $CO_2$ absorbing solution, and is used to absorb the amine absorbent 30 accompanying the treated flue gas 16.

The regenerated amine absorbent (lean solution) is fed to the $CO_2$ absorber 21 side by a lean solution pump 38 through the lean solution supply line $L_2$ and is circularly used as the amine absorbent 30.

Therefore, the amine absorbent 30 forms a closed path that circulates the $CO_2$ absorber 21 and the absorbent regenerator 22 and is reused in the $CO_2$ absorbing unit 21a of the $CO_2$ absorber 21. The amine absorbent 30 is supplied from a supply line (not illustrated) according to need, and heat-stable salt in the amine absorbent is reduced by a reclaimer (not illustrated) according to need.

The desulfurized flue gas 14 supplied to the $CO_2$ absorber 21 is cooled by cooling water 51 in the cooler 50 arranged in the preceding stage, and is thereafter introduced into the $CO_2$ absorber 21. A reference code $L_7$ denotes a cooling water circulation line.

If $SO_3$ mist contained in the desulfurized flue gas 14 is introduced into the $CO_2$ absorber 21 as it is, the $SO_3$ mist becomes a core of the mist of the amine absorbent. Therefore, if the $SO_3$ mist is reduced before the $SO_3$ mist is introduced into the absorber 21, it becomes possible to reduce the amount of the mist of the amine absorbent to be generated.

As described above, with the amine absorbent 30 that is circularly used between the $CO_2$ absorber 21 and the absorbent regenerator 22, the treated flue gas 16 with $CO_2$ reduced and the washing water 32 are brought into counter-current contact with each other in the two or more washing units 21b arranged in a staged manner, and liquid and gas of the amine absorbent accompanying the treated flue gas 16 are absorbed and reduced by the washing water 32, so that the gas of the amine absorbent 30 is prevented from being dispersed into the outside of the $CO_2$ absorber 21.

According to the fourth embodiment, the two washing units 21b are arranged in a staged manner on the downstream side of the gas flow (in the drawing, on the head side) of the $CO_2$ absorbing unit 21a. However, it is possible to arrange three or more washing units.

Furthermore, it is possible to add acid as the washing water of the washing unit arranged on the top portion 21c side.

Fifth Embodiment

A $CO_2$ recovery apparatus in an air pollution control system according to a fifth embodiment of the present invention will be explained with reference to the drawings. FIG. 7 is a diagram illustrating an example of the $CO_2$ recovery apparatus in the air pollution control system according to the fifth embodiment.

As illustrated in FIG. 7, a $CO_2$ recovery apparatus 15B according to the fifth embodiment additionally includes a wet electrostatic precipitator 60 on the upstream side of the cooler 50 in the $CO_2$ recovery apparatus 15A according to the fourth embodiment.

With the wet electrostatic precipitator 60 provided on the upstream side of the cooler 50, it is possible to reduce the $SO_3$ mist contained in the desulfurized flue gas 14 by charging the $SO_3$ mist.

According to the fifth embodiment, it is possible to further reduce the $SO_3$ mist contained in the desulfurized flue gas 14, compared with the fourth embodiment. Because the $SO_3$ mist is reduced before the $SO_3$ mist is introduced into the absorber 21, it is possible to reduce the amount of the mist of the amine absorbent to be generated.

Sixth Embodiment

A $CO_2$ recovery apparatus in an air pollution control system according to a sixth embodiment of the present invention will be explained with reference to the drawing. FIG. 8 is a diagram illustrating an example of the $CO_2$ recovery apparatus in the air pollution control system according to the sixth embodiment.

FIG. 8 is a schematic diagram of a $CO_2$ recovery apparatus in an air pollution control system according to a modification of the fifth embodiment. While the cooler 50 illustrated in FIG. 7 simply cools the desulfurized flue gas 14, a $CO_2$ recovery apparatus 15C of the air pollution control system illustrated in FIG. 8 includes a finishing desulfurizing unit 61 in the lower portion of the cooler 50. Limestone ($CaCO_3$) 62a and oxidation air 62b are supplied as a desulfurization absorbent to the finishing desulfurizing unit 61 to form gypsum 62c through lime-gypsum desulfurization. Therefore, sulfur oxide remaining in the desulfurized flue gas 14 fed from the desulfurizer 13 is removed, so that the efficiency of the desulfurization can further be improved. It may be possible to add strong alkaline agent, such as sodium hydroxide, together with limestone.

A reference code $L_8$ denotes a desulfurization absorbent circulation line.

According to the sixth embodiment, a liquid column system is used as a system for supplying a desulfurization absorbent in the finishing desulfurizing unit 61. However, the present invention is not limited to the above, and a watering system, a jet nozzle system, or a filling system may be used.

Examples of the desulfurization absorbent used in the finishing desulfurizing unit 61 include a strong alkaline agent, such as NaOH, $Na_2CO_3$, $NaHCO_3$, $Ca(OH)_2$, $Mg(OH)_2$, in addition to limestone ($CaCO_3$). With the aid of the strong alkaline agent, it becomes possible to further improve the desulfurization performance. In particular, the strong alkaline agent is effective when the desulfurized flue gas 14 containing high-density sulfur oxide is introduced, and in this case, it becomes possible to extremely reduce the concentration of sulfur oxide contained in the desulfurized flue gas 14 to be introduced into the $CO_2$ recovery apparatus 15C. Therefore, this method is desirable because the desulfurization performance can be improved and good desulfurization performance can be ensured even when the concentration of sulfur oxide contained in the desulfurized flue gas 14 is high, compared with the lime-gypsum desulfurization.

According to the sixth embodiment, the wet electrostatic precipitator 60 is provided on the upstream side of the cooler 50. However, the present invention is not limited to the above. The wet electrostatic precipitator 60 may be provided on the downstream side of the cooler 50.

As described in the following seventh embodiment, it is possible to integrally arrange the wet electrostatic precipitator inside the cooler.

Seventh Embodiment

A $CO_2$ recovery apparatus in an air pollution control system according to the seventh embodiment will be explained with reference to the drawings. FIG. 9 is a diagram illustrating an example of the $CO_2$ recovery apparatus in the air pollution control system according to the seventh embodiment.

As illustrated in FIG. 9, a $CO_2$ recovery apparatus 15D according to the seventh embodiment is configured such that the wet electrostatic precipitator described in the sixth embodiment is provided inside a cooler.

Therefore, a wet electrostatic precipitator integrated cooler 70 including the finishing desulfurizing unit 61 that finishes desulfurization and including a wet electrostatic precipitator 71 is constructed.

A reference code $L_9$ denotes a washing liquid circulation line of the wet electrostatic precipitator 71.

The wet electrostatic precipitator 71 according to the seventh embodiment has a function of reducing a mist-generating substance. Compared with the system of the sixth embodiment, a wet electrostatic precipitator need not be installed separately, so that an installation space need not be ensured.

According to the seventh embodiment, $SO_3$ that is a mist-generating substance contained in the desulfurized flue gas 14 can be reduced while the $SO_3$ is in the mist state, so that it is possible to reduce the amount of $SO_3$ mist introduced into the $CO_2$ recovery apparatus 15D. Therefore, it is possible to largely suppress the amount of the mist of the amine absorbent based on mist and accompanying the treated flue gas 16 discharged from the $CO_2$ absorber 21.

As explained above in the embodiments, according to the present invention, the treated flue gas 16 discharged from the $CO_2$ absorber 21 is neutralized by supplying gas containing SOx, such as desulfurized flue gas or flue gas, so that it is possible to prevent remaining amine from being released to the outside, enabling to prevent dispersion of the remaining amine to the air and generation of nitrosamine.

REFERENCE SIGNS LIST

10A-10C Air pollution control system
11 Boiler
12 Flue gas
13 Desulfurizer
14 Desulfurized flue gas
15 $CO_2$ recovery apparatus
16 Treated flue gas
17 Treated flue gas stack
18 Desulfurized flue gas stack
19 Amine concentration meter
21 $CO_2$ absorber
22 Absorbent regenerator

The invention claimed is:

1. An air pollution control system comprising:
    a desulfurization apparatus that reduces sulfur oxide contained in flue gas supplied from a boiler; and
    a $CO_2$ recovery apparatus that includes
        a $CO_2$ absorber that reduces $CO_2$ contained in flue gas that has been desulfurized by the desulfurization apparatus, by an amine absorbent, and
        an absorbent regenerator that regenerates the amine absorbent, wherein
    gas containing SOx is supplied to treated flue gas, from which $CO_2$ is reduced and which is discharged from a top portion of the $CO_2$ absorber, so that remaining mist amine accompanying the treated flue gas is neutralized to amine sulfate or amine sulfite.

2. The air pollution control system according to claim 1, wherein
    the gas containing SOx is part of flue gas obtained on one of an upstream side or a downstream side of the desulfurization apparatus.

3. The air pollution control system according to claim 1, the treated flue gas does not contain gas amine.

4. The air pollution control system according to claim 1, further comprising a measuring unit that measures the remaining mist amine.

5. The air pollution control system according claim 1, further comprising a measuring unit that measures the remaining mist amine, wherein
    a sufficient amount of SOx is supplied to the remaining mist amine to neutralize the remaining mist amine, on the basis of a concentration of the remaining mist amine measured by the measuring unit.

6. The air pollution control system according to claim 1, wherein
    the $CO_2$ absorber includes
        a $CO_2$ absorbing unit that reduces $CO_2$ by bringing the amine absorbent and the flue gas in counter-current contact with each other; and
        at least one washing unit that is arranged on a downstream side of gas flow in the $CO_2$ absorbing unit and that reduces remaining amine contained in the flue gas.

7. The air pollution control system according to claim 1, further comprising a cooler that is arranged on an upstream side of the $CO_2$ absorber and that cools the flue gas.

8. The air pollution control system according to claim 7, further comprising a wet electrostatic precipitator on an upstream side of the cooler.

9. The air pollution control system according to claim 7, further comprising a finishing desulfurizing unit at a lower portion of the cooler.

10. The air pollution control system according to claim 7, further comprising a finishing desulfurizing unit and a wet electrostatic precipitator at a lower portion of the cooler.

11. The air pollution control system according to claim 1, further comprising:
    a denitrization apparatus that reduces nitrogen oxide contained in the flue gas; and
    a dry electrostatic precipitator that reduces soot contained in the flue gas.

12. An air pollution control method comprising:
    reducing, by a desulfurization apparatus, sulfur oxide contained in flue gas that contains $CO_2$ and that is supplied from a boiler;
    reducing, in a $CO_2$ absorber, $CO_2$ contained in flue gas that is desulfurized at the reducing by the desulfurization apparatus, by an amine absorbent; and
    supplying gas containing SOx to treated flue gas, from which $CO_2$ is reduced and which is discharged from a top portion of the $CO_2$ absorber, thereby neutralizing remaining mist amine accompanying the treated flue gas to amine sulfate or amine sulfite.

13. The air pollution control method according to claim 12, wherein
    the gas containing SOx is part of flue gas obtained on one of an upstream side or a downstream side of the desulfurization apparatus.

14. The air pollution control method according to claim 12, wherein
    the treated flue gas does not contain gas amine.

15. The air pollution control method according to claim 12, further comprising:
    measuring, by a measuring unit, the remaining mist amine; and
    supplying a sufficient amount of SOx to the remaining mist amine to neutralize the remaining mist amine, on the basis of concentration of the remaining mist amine measured at the measuring.

* * * * *